United States Patent
Cui et al.

(10) Patent No.: US 9,108,266 B2
(45) Date of Patent: Aug. 18, 2015

(54) WELDED COMPONENT, A WELDED GAS TURBINE COMPONENT, AND A PROCESS OF WELDING A COMPONENT

(75) Inventors: Yan Cui, Greer, SC (US); Ganjiang Feng, Greenville, SC (US); Srikanth Kottilingam, Simpsonville, SC (US); Dechao Lin, Greer, SC (US)

(73) Assignee: General Electric Company, Schenectady, NY (US)

( * ) Notice: Subject to any disclaimer, the term of this patent is extended or adjusted under 35 U.S.C. 154(b) by 595 days.

(21) Appl. No.: 13/089,719

(22) Filed: Apr. 19, 2011

(65) Prior Publication Data

US 2012/0267344 A1 Oct. 25, 2012

(51) Int. Cl.
| | |
|---|---|
| B23K 15/00 | (2006.01) |
| B23K 26/00 | (2014.01) |
| B23K 26/20 | (2014.01) |
| B23K 26/32 | (2014.01) |

(52) U.S. Cl.
CPC ......... *B23K 15/0093* (2013.01); *B23K 15/0073* (2013.01); *B23K 26/203* (2013.01); *B23K 26/3233* (2013.01); *B23K 2201/001* (2013.01); *B23K 2203/18* (2013.01); *Y10T 428/12493* (2015.01)

(58) Field of Classification Search
USPC .................. 428/610, 678, 680; 228/225–226
See application file for complete search history.

(56) References Cited

U.S. PATENT DOCUMENTS

| | | | |
|---|---|---|---|
| 4,703,885 A | 11/1987 | Lindgren et al. | |
| 6,489,583 B1 | 12/2002 | Feng et al. | |
| 6,596,411 B2 | 7/2003 | Feng et al. | |
| 7,533,795 B2 | 5/2009 | Schaeffer et al. | |
| 2002/0079655 A1* | 6/2002 | Aksit et al. | 277/650 |
| 2003/0102061 A1* | 6/2003 | Spiegel et al. | 148/527 |
| 2003/0108767 A1 | 6/2003 | Feng et al. | |
| 2007/0189894 A1 | 8/2007 | Thamboo et al. | |
| 2007/0281175 A1* | 12/2007 | Hoffmann et al. | 428/457 |
| 2008/0105659 A1 | 5/2008 | Arnett et al. | |
| 2008/0164301 A1 | 7/2008 | Nowak et al. | |
| 2010/0124669 A1* | 5/2010 | Lee et al. | 428/660 |
| 2010/0243621 A1 | 9/2010 | Nowak | |
| 2011/0059323 A1* | 3/2011 | Schmitz et al. | 428/450 |

FOREIGN PATENT DOCUMENTS

EP 1944117 A1 7/2008

OTHER PUBLICATIONS

Shige et al., "Development of Large-Capacity, Highly Efficient Welded Rotor for Steam Turbines", Mitsubishi Heavy Indus. Technical Review, vol. 38, No. 1, pp. 6-11, Feb. 2001.*
Search Report and Written Opinion from corresponding EP Application No. 12164030.4-2302 dated Aug. 10, 2012.
(Continued)

*Primary Examiner* — Humera Sheikh
*Assistant Examiner* — Lucas Wang
(74) *Attorney, Agent, or Firm* — McNees, Wallace & Nurick, LLC (57) ABSTRACT

A welded component, a welded gas turbine component, and a process of welding a component are disclosed. The welded component includes a first alloy, a second alloy, and a weld positioned between the first alloy and the second alloy. The weld is formed by a first shim and a second shim being beam welded.

19 Claims, 5 Drawing Sheets

(56) References Cited

OTHER PUBLICATIONS

Haynes 230 allloy, "Heat-Resistant, Alloy at a Glance", Haynes International, http://www.haynesintl.com/pdf/h3135.pdf, copyright 2010.

Specialty Metals on Demand, www.megamix.com/hastelloy-c 276-c276-nickel-alloy. htm, Dec. 16, 2010, 1823 Roughneck Drive, Humble, TX 77338, MegaMix, copyright 2010.

High Temp Metals, Inconel 617 Technical Data, www.hightempmetals.com/techdata/hitempInconel617.data.php, Dec. 16, 2010.

* cited by examiner

WELDED COMPONENT, A WELDED GAS TURBINE COMPONENT, AND A PROCESS OF WELDING A COMPONENT

FIELD OF THE INVENTION

The present invention is directed to manufactured components and processes of forming manufactured components. More specifically, the present invention relates welded components and processes of welding components.

BACKGROUND OF THE INVENTION

The operating temperature within a gas turbine is both thermally and chemically hostile. Significant advances in high temperature capabilities have been achieved through the development of iron, nickel, and cobalt-based superalloys and the use of environmental coatings capable of protecting superalloys from oxidation, hot corrosion, etc. Parts can be fabricated by joining subcomponents including the superalloys. It is desirable to improve weldability based upon liquation and strain age cracking. Improving the weldability can extend the usable life of the parts.

In the compressor portion of a gas turbine, atmospheric air is compressed to 10-25 times atmospheric pressure, and adiabatically heated to 700° F.-1250° F. (371° C.-677° C.) in the process. This heated and compressed air is directed into a combustor, where it is mixed with fuel. The fuel is ignited, and the combustion process heats the gases to very high temperatures, in excess of 3000° F. (1650° C.). These hot gases pass through the turbine, where airfoils fixed to rotating turbine disks extract energy to drive an attached generator which produces electrical power. To improve the efficiency of operation of the turbine, combustion temperatures have been raised. Of course, as the combustion temperature is raised, steps must be taken to prevent thermal degradation of the materials forming the flow path for these hot gases of combustion.

Certain known alloys may be used for components disposed along the flow path of these hot gases. Certain portions of these components must be able to withstand temperatures higher than other portions of these components. For example, certain portions may be resistant to temperatures for adiabatically heated (for example, 800° F.-1250° F.) and other portions may be further resistant to hot gases heated by the combustion processes (for example, in excess of 3000° F.). Components made entirely of alloys resistant to the highest temperature may be undesirable by being overly expensive or by failing to include other properties desirable in other portions of the components. Alternatively, components made entirely of alloys resistant only to the temperature of the lower temperature portions may fail.

A welded component, a welded gas turbine component, and a process of welding a component that do not suffer from one or more of the above drawbacks would be desirable in the art.

BRIEF DESCRIPTION OF THE INVENTION

According to an exemplary embodiment, a welded component includes a first alloy subcomponent, a second alloy subcomponent, and a weld between the first alloy subcomponent and the second alloy subcomponent. The weld includes a gradient having a transition region.

According to another exemplary embodiment, a welded gas turbine component includes a first alloy, a second alloy, and a weld positioned between the first alloy and the second alloy. The weld is formed by a first shim and a second shim being beam welded.

According to another exemplary embodiment, a process of welding a component includes positioning a first alloy, positioning a second alloy, positioning a first shim and a second shim between the first alloy and the second alloy, and beam welding the first shim and the second shim to form a weld between the first alloy and the second alloy.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a welded component, a welded gas turbine component (for example, a gas turbine shroud, a gas turbine blade, or a gas turbine nozzle), and a process of welding a component. Embodiments of the present disclosure have increased fusion weldability, have decreased liquation tendency, have decreased strain age cracking tendency, permit use of portions having otherwise incompatible properties, have increased stress resistance, have increased ductility, and combinations thereof.

Figure 1:
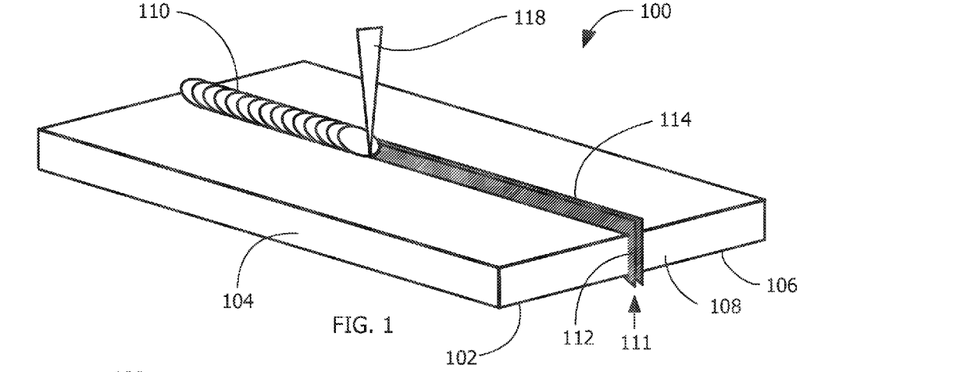
FIG. 1 shows a perspective view of a component being welded.

Referring to FIG. 1, a component 100 includes a first portion 102 or subcomponent having a first alloy 104 and a second portion 106 or subcomponent having a second alloy 108. The first portion 102 and the second portion 106 are welded together by using two or more shims 111 forming a weld 110. The weld 110 is formed by a first shim 112 positioned proximal to the first portion 102 and a second shim 114 positioned between the first shim 112 and the second portion 106. The weld 110 is beam welded, for example, by an energy beam 118, such as an electron beam or laser beam. In further embodiments, a third shim 602 or more shims also form the weld 110 (see FIGS. 6 and 8). The shims 111 form a gradient composition within a joint gap 202 (see FIG. 2) positioned between the first portion 102 and the second portion 106, thereby improving the weldability and joint properties of the weld 110.

Figure 2:
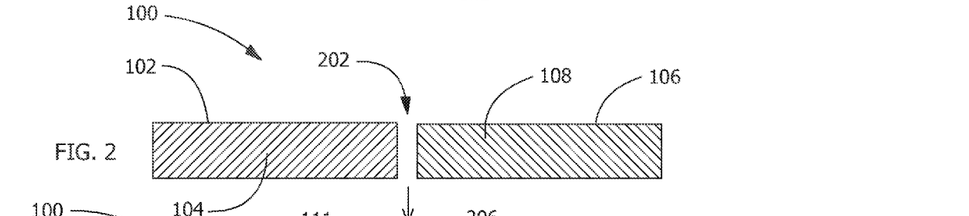
FIG. 2 shows a schematic side view of a component having a joint gap between a first portion and a second portion.
Figure 3:
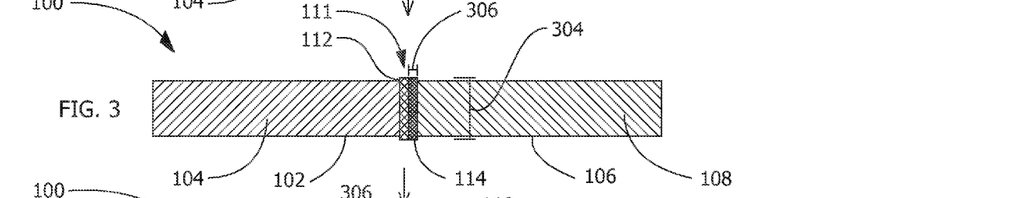
FIG. 3 shows a schematic side view of a component having two shims inserted between a first portion and a second portion of the component.
Figure 4:
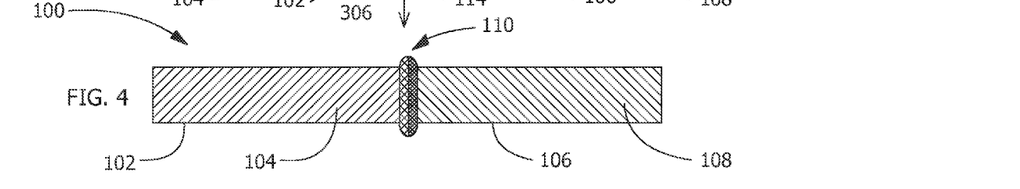
FIG. 4 shows a schematic side view of a component having a weld formed by beam welding of two shims inserted between a first portion and a second portion of the component.

FIGS. 2-4 schematically show the first portion 102 and the second portion 106 at various stages of an exemplary process of forming the component 100. FIG. 2 shows a side view of the component 100 with the first portion 102 and the second portion 106 being separate and being arranged to form the joint gap 202. In this embodiment, the joint gap 202 completely separates the first portion 102 and the second portion 106. In another embodiment, the first portion 102 and the second portion 106 are partially attached and the joint gap 202 extends between the first portion 102 and the second portion 106. Referring to FIG. 3, according to an embodiment of the process, upon the first portion 102 and the second portion 106 being positioned, the first shim 112 and the second shim 114 are positioned within the joint gap 202 between the first alloy 102 and the second alloy 106. The shims 111 are beam welded (for example, electron beam or laser welded) to form the weld 110 shown in FIG. 4.

The first alloy 104 in the first portion 102 of the component 100 differs in composition from the second alloy 108 in the second portion 106 of the component 100. In one embodiment, the first alloy 104 and the second alloy 108 are any suitable superalloys.

In one embodiment, the first alloy 104 or the second alloy 108 includes a nickel-based alloy having, by weight, up to about 15% chromium, up to about 10% cobalt, up to about 4% tungsten, up to about 2% molybdenum, up to about 5% titanium, up to about 3% aluminum, and up to about 3% tantalum. In a further embodiment, the first alloy 104 or the second alloy 108 has a composition, by weight, of about 14% chromium, about 9.5% cobalt, about 3.8% tungsten, about 1.5% molybdenum, about 4.9% titanium, about 3% aluminum, about 0.1% carbon, about 0.01% boron, about 2.8% tantalum, and a balance of nickel.

In one embodiment, the first alloy 104 or the second alloy 108 includes a nickel-based alloy having, by weight, up to about 10% chromium, up to about 8% cobalt, up to about 4% titanium, up to about 5% aluminum, up to about 6% tungsten, and up to about 5% tantalum. In a further embodiment, the first alloy 104 or the second alloy 108 has a composition, by weight, of about 9.8% chromium, about 7.5% cobalt, about 3.5% titanium, about 4.2% aluminum, about 6% tungsten, about 1.5% molybdenum, about 4.8% tantalum, about 0.09% carbon, about 0.009% boron, and a balance of nickel.

In one embodiment, the first alloy 104 or the second alloy 108 includes a nickel-based alloy having, by weight, up to about 8% cobalt, up to about 7% chromium, up to about 6% tantalum, up to about 7% aluminum, up to about 5% tungsten, up to about 3% rhenium, and up to about 2% molybdenum. In a further embodiment, the first alloy 104 or the second alloy 108 has a composition, by weight, of about 8% cobalt, about 7% chromium, about 6% tantalum, about 6.2% aluminum, about 5% tungsten, about 3% rhenium, about 2% molybdenum, about 0.2% hafnium and a balance of nickel.

In one embodiment, the first alloy 104 or the second alloy 108 includes a nickel-based alloy having, by weight, up to about 10% chromium, up to about 8% cobalt, up to about 5% aluminum, up to about 4% titanium, up to about 2% molybdenum, up to about 6% tungsten, and up to about 5% tantalum. In a further embodiment, the first alloy 104 or the second alloy 108 has a composition, by weight, of about 10% chromium, about 8% cobalt, about 4.2% aluminum, about 3.5% titanium, about 2% molybdenum, about 6% tungsten, about 5% tantalum, about 0.5% niobium, about 0.2% hafnium, and a balance of nickel.

In one embodiment, the first alloy 104 or the second alloy 108 includes a nickel-based alloy having, by weight, up to about 10% cobalt, up to about 8% chromium, up to about 10% tungsten, up to about 6% aluminum, up to about 3% tantalum, and up to about 2% hafnium. In a further embodiment, the first alloy 104 or the second alloy 108 has a composition, by weight, of about 9.5% cobalt, about 8% chromium, about 9.5% tungsten, about 0.5% molybdenum, about 5.5% aluminum, about 0.8% titanium, about 3.0% tantalum, about 0.01 zirconium, about 0.10 carbon, about 1.5% hafnium and a balance of nickel.

In one embodiment, the first alloy 104, the second alloy 108, or the first alloy 104 and the second alloy 108 are alloys capable of withstanding predetermined temperatures (for example, temperatures of a gas turbine hot gas path). For example, in one embodiment, the first alloy 102 is resistant to heat above a first/higher temperature (for example, about 1000° F., about 1250° F., about 1500° F., about 2000° F., or about 3000° F.) and the second alloy 108 is resistant to heat above a second/lower temperature (for example, between 800° F. and 1250° F., about 800° F., about 1000° F., about 1250° F., about 1500° F., or about 2000° F.). In one embodiment, the first temperature is substantially higher than the second temperature. In a further embodiment, the second alloy 108 is not resistant to the first/higher temperature. Additionally or alternatively, in one embodiment, the first alloy 104, the second alloy 108 or the first alloy 104 and the second alloy 108 include single crystal grains, directionally-solidified grains, or equiaxed grains.

Referring to FIGS. 2-4, upon being welded, the shims 111 have a modified microstructure within the joint gap 202, thereby modifying the properties of the weld 110. The shims 111 are thin bands of material positionable within the joint gap 202. In one embodiment, one or more of the shims 111 are flexible and capable of being stored as a roll prior to use. In one embodiment, one or more of the shims 111 are a predetermined length (for example, a length corresponding to a length of a surface on the first portion 102 or the second portion 106), a predetermined height 304 (for example, a height corresponding to a height of the first portion 102 and/or the second portion 106), a predetermined thickness 306 (for example, as described below with reference to FIGS. 5-8), or combinations thereof. In one embodiment, the shims 111 vary in thickness along the length of the shims 111. In this embodiment, thicker portions of the shims 111 correspond to regions of the joint gap 202 benefiting from greater amounts of material and thinner portions of the shims 111 correspond to regions of the joint gap 202 benefiting from the presence of lower amounts of material.

Figure 5:
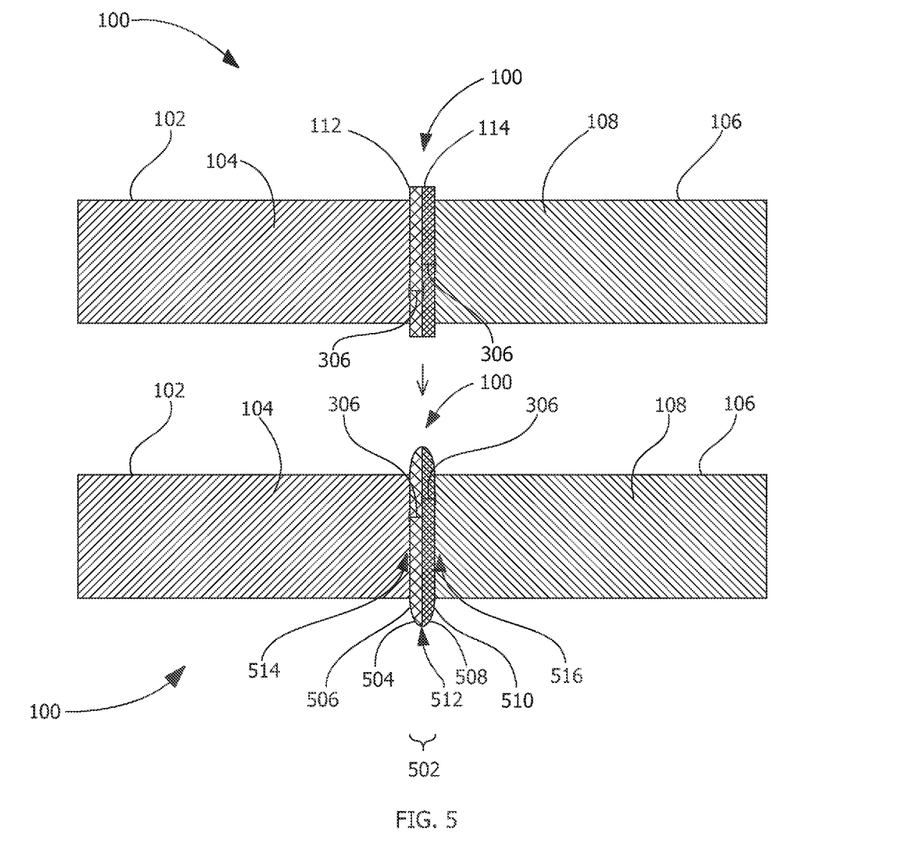
FIG. 5 shows a schematic side view of two shims positioned within a component and welded within the component.

Referring to FIG. 5, in one embodiment, the first shim 112 and the second shim 114 have substantially identical thicknesses 306 (for example, about 0.02 inches each, about 0.01 inches each, or between about 0.01 inches and about 0.03 inches each). Upon receiving the energy from the energy beam 118, the first shim 112 and the second shim 114 form the weld 110 having a gradient 502 including a first region 504 of a first shim material 506, a second region 508 of a second shim material 510, a shim transition region 512 (for example, a fusion zone) between the first shim material 506 and the second shim material 510, a first shim-alloy transition region 514 (for example, a first heat affected zone) between the first shim material 506 and the first alloy 104, and a second shim-alloy transition region 516 (for example, a second heat affected zone) between the second shim material 510 and the second alloy 108. In this embodiment, the first region 504 and the second region 508 have substantially identical thicknesses 306.

Figure 6:
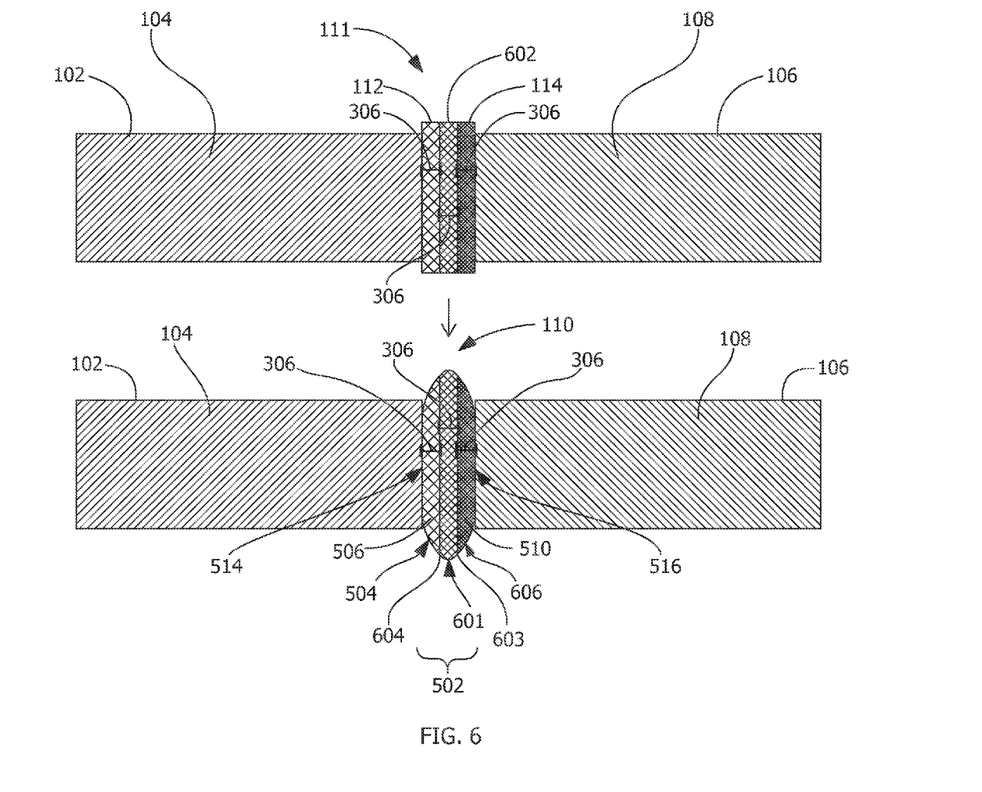
FIG. 6 shows a schematic side view of three shims positioned within a component and welded within the component.

Referring to FIG. 6, in one embodiment, the first shim 112, the second shim 114, and a third shim 602 (for example, a middle shim) have substantially identical thicknesses 306

(for example, about 0.02 inches each, about 0.01 inches each, or between about 0.01 inches and about 0.03 inches each). Upon receiving the energy from the energy beam 118, the first shim 112, the second shim 114, and the third shim 602 form the weld 110 having the gradient 502 including the first region 504 of the first shim material 506, the second region 508 of the second shim material 510, a third region 601 of a third shim material 603, a first shim-shim transition zone 604 (for example, a first fusion zone) between the first shim material 506 and the third shim material 603, a second shim-shim transition zone 606 (for example, a second fusion zone) between the second shim material 608 and the third shim material 603, the first shim-alloy transition region 514 between the first shim material 506 and the first alloy 104, and the second shim-alloy transition region 516 between the second shim material 510 and the second alloy 108. In this embodiment, the first region 504 and the second region 508 have substantially identical thicknesses 306 and the third region 601 has a greater thickness 306.

Figure 7:
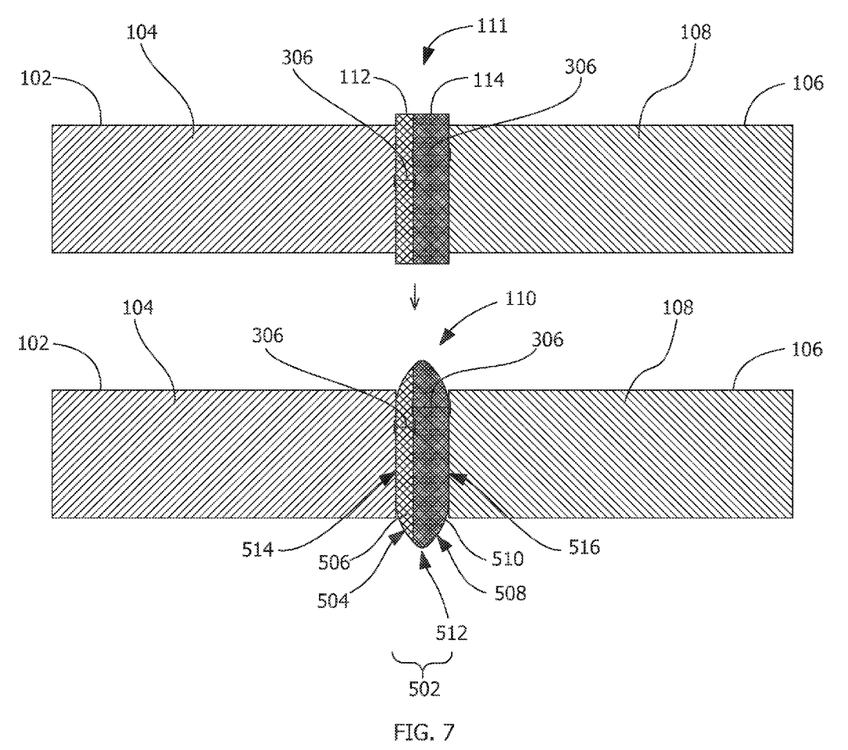
FIG. 7 shows a schematic side view of two shims positioned within a component and welded within the component.

Referring to FIG. 7, in one embodiment, the first shim 112 and the second shim 114 have different thicknesses 306 (for example, the first shim 112 having a thickness of about 0.01 inches and the second shim 114 having a thickness of about 0.02 inches or the first shim 112 having a thickness of 0.02 inches and the second shim 114 having a thickness of about 0.03 inches). Upon receiving the energy from the energy beam 118, the first shim 112 and the second shim 114 form the weld 110 having the gradient 502 including the first region 504 of the first shim material 506, the second region 508 of the second shim material 510, the shim transition region 512 between the first shim material 506 and the second shim material 510, the first shim-alloy transition region 514 between the first shim material 506 and the first alloy 104, and the second shim-alloy transition region 516 between the second shim material 510 and the second alloy 108. In this embodiment, the first region 504 and the second region 508 have different thicknesses 306.

Figure 8:
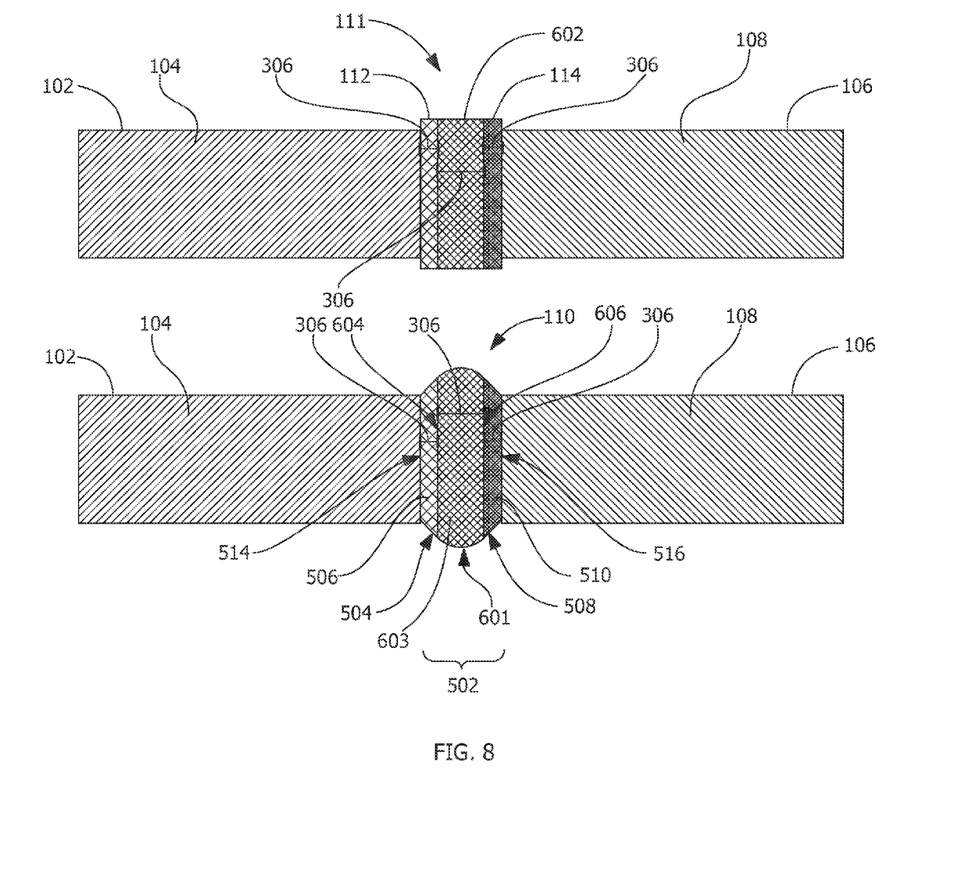
FIG. 8 shows a schematic side view of three shims positioned within a component and welded within the component.

Referring to FIG. 8, in one embodiment, the first shim 112 and the second shim 114 have substantially identical thicknesses 306 and the third shim 602 has a different thickness 306 (for example, the first shim 112 and the second shim 114 having thicknesses of about 0.01 inches and the third shim 602 having a thickness of about 0.02 inches or the first shim 112 and the second shim 114 having thicknesses of about 0.02 inches and the third shim 602 having a thickness of about 0.03 inches). Upon receiving the energy from the energy beam 118, the first shim 112, the second shim 114, and the third shim 602 form the weld 110 having the gradient 502 including the first region 504 of the first shim material 506, the second region 508 of the second shim material 510, the third region 601 of the third shim material 603, the first shim-shim transition zone 604 between the first shim material 506 and the third shim material 603, the second shim-shim transition zone 606 between the second shim material 510 and the third shim material 603, the first shim-alloy transition region 514 between the first shim material 506 and the first alloy 104, and the second shim-alloy transition region 516 between the second shim material 510 and the second alloy 108. In this embodiment, the first region 504 and the second region 508 have substantially identical thicknesses 306 and the third region 601 has a greater thickness 306.

The shims 111 are selected and positioned corresponding to one or more of the properties and/or compositions of the first alloy 104 and/or the second alloy 108 and the properties and/or compositions of adjacent shims. For example, in one embodiment, the first shim 112 includes a composition and/or property compatible with the first alloy 104 and is positioned proximal to the first portion 102 including the first alloy 104. For example, in one embodiment, the composition include Al, Ti, or any other suitable component at a predetermined concentration for compatibility. In this embodiment, the second shim 114 includes a composition and/or property compatible with the second alloy 108 and is positioned proximal to the second portion 106 including the second alloy 108. In one embodiment, the first shim 112 and the second shim 114 include compatible compositions and are positioned adjacent to each other for welding. In another embodiment, the third shim 602 is positioned between the first shim 112 and the second shim 114 and includes a composition providing additional desired properties (for example, strength and/or compatibility with each of the first shim 112 and the second shim 114).

In one embodiment, the shims 111 are selected and positioned based upon chemistry of the alloys. For example, in one embodiment, the first alloy 104 is a casting superalloy and the first shim 112 includes low aluminum content (for example, by weight, below about 3% with about 0% titanium, below about 2.5% with about 1% titanium, below about 2% with about 2% titanium, or linear interpolations or extrapolations thereof). In this embodiment, material within the fusion boundary (for example, the shim transition zone 512, the first shim-shim transition zone 604, the second shim-shim transition zone 606, or combinations thereof) is within the weldable material range, thereby reducing or eliminating strain age cracking in the heat affected zone of the first alloy 104.

In one embodiment, the first alloy 104 is a casting superalloy and one or more of the shims 111 is selected for high ductility (for example, based upon elongation being between about 30% and about 65% or between about 55% and about 65%). In this embodiment, the weld 110 is resistant to liquation cracking, such as centerline cracking. In another embodiment, one or more of the shims 111 is selected to include low gamma prime volume.

In one embodiment, at least one of the first shim material 506, the second shim material 510, and the third shim material 603 has a composition, by weight, of about 20% to about 24% chromium, about 3% iron, about 0.3% to about 1% magnesium, about 1% to about 3% molybdenum, about 0.2% to about 0.5% aluminum, and a remainder nickel.

In one embodiment, at least one of the first shim material 506, the second shim material 510, and the third shim material 603 has a composition, by weight, of about 20% to about 24% chromium, about 3% iron, about 1% magnesium, about 8% to about 10% molybdenum, about 1% silicon, and a remainder nickel.

In one embodiment, at least one of the first shim material 506, the second shim material 510, and the third shim material 603 has a composition, by weight, of about 14.5% to about 16.5% chromium, about 4% to about 7% iron, about 1% magnesium, about 15% to about 17% molybdenum, about 0.8% silicon, and a remainder nickel.

In one embodiment, at least one of the first shim material 506, the second shim material 510, and the third shim material 603 includes a nickel-based alloy having, by weight, up to about 22% chromium, up to about 13% cobalt, up to about 3% iron, and up to about 9% molybdenum. In a further embodiment, at least one of the first shim material 506, the second shim material 510, and the third shim material 603 has a composition, by weight, of about 22% chromium, about 12.5% cobalt, about 1.1% aluminum, 0.1% carbon, about 3% iron, about 1% manganese, about 1% silicon, about 0.6% titanium, about 9% molybdenum, and a balance of nickel.

In one embodiment, at least one of the first shim material 506, the second shim material 510, and the third shim material 603 includes a nickel-based alloy having, by weight, up to about 3% iron, up to about 20% chromium, up to about 3% manganese. In a further embodiment, at least one of the first shim material 506, the second shim material 510, and the third shim material 603 has a composition, by weight, of about 3% iron, about 20% chromium, about 0.5% silicon, about 3% manganese, about 0.7% titanium, about 0.1% carbon and a balance of nickel.

In one embodiment, at least one of the first shim material 506, the second shim material 510, and the third shim material 603 includes a nickel-based alloy, having, by weight, up to about 22% chromium, up to about 14% tungsten, and up to about 2% molybdenum. In a further embodiment, at least one of the first shim material 506, the second shim material 510, and the third shim material 603 has a composition, by weight, of about 0.1% carbon, about 1% iron, about 22% chromium, about 14% tungsten, about 1.5% molybdenum, about 0.5% manganese, about 0.4% silicon, about 0.3% aluminum, about 0.02% lanthanide, about 0.004% boron, and a balance of nickel.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A welded component, comprising:
   a first alloy subcomponent;
   a second alloy subcomponent; and
   a weld between the first alloy subcomponent and the second alloy subcomponent;
   wherein the weld includes a gradient having a transition region, the transition region formed by a plurality of shims;
   wherein the gradient includes a first welded shim composition at least partially formed by welding of a first shim having a first shim composition, a second welded shim composition at least partially formed by welding of a second shim having a second shim composition, a shim-shim transition composition between the first welded shim composition and the second welded shim composition, a first shim-alloy transition composition between the first welded shim composition and the first alloy subcomponent, and a second shim-alloy transition composition between the second welded shim composition and the second alloy subcomponent;
   wherein the first shim composition includes a nickel-based alloy including, by weight, up to about 22% chromium;
   wherein the gradient has a gradient composition, the gradient composition increasing or decreasing in concentration, by weight, of one or both of aluminum and titanium front the first alloy subcomponent, through the first welded shim composition, through the shim-shim transition composition, through the second welded shim composition, to the second alloy subcomponent.

2. The welded component of claim 1, wherein the first alloy subcomponent has a first subcomponent composition and the second alloy subcomponent has a second subcomponent composition, the first subcomponent composition differing from the second subcomponent composition.

3. The welded component of claim 2, wherein the first subcomponent composition is a nickel-based alloy including, by weight, up to about 15% chromium, up to about 10% cobalt, up to about 4% tungsten, up to about 2% molybdenum, up to about 5% titanium, up to about 3% aluminum, and up to about 3% tantalum.

4. The welded component of claim 2, wherein the first subcomponent composition is a nickel-based alloy including, by weight, up to about 10% chromium, up to about 8% cobalt, up to about 4% titanium, up to about 5% aluminum, up to about 6% tungsten, and up to about 5% tantalum.

5. The welded component of claim 2, wherein the first subcomponent composition is a nickel-based alloy including, by weight, up to about 8% cobalt, up to about 7% chromium, up to about 6% tantalum, up to about 7% aluminum, up to about 5% tungsten, up to about 3% rhenium, and up to about 2% molybdenum.

6. The welded component of claim 2, wherein the first subcomponent composition is a nickel-based alloy including, by weight, up to about 10% chromium, up to about 8% cobalt, up to about 5% aluminum, up to about 4% titanium, up to about 2% molybdenum, up to about 6% tungsten, and up to about 5% tantalum.

7. The welded component of claim 2, wherein the first subcomponent composition is nickel-based alloy including, by weight, up to about 10% cobalt, up to about 8% chromium, up to about 10% tungsten, up to about 6% aluminum, up to about 3% tantalum, and up to about 2% hafnium.

8. The welded component of claim 1, wherein the first welded shim composition and the second welded shim composition have substantially identical thicknesses.

9. The welded component of claim 1, wherein the first welded shim composition and the second welded shim composition have different thicknesses.

10. The welded component of claim 1, wherein the nickel-based alloy includes, by weight, up to about 13% cobalt, up to about 3% iron, and up to about 9% molybdenum.

11. The welded component of claim 1, wherein the nickel-based alloy includes, by weight, up to about 3% iron, up to about 20% chromium, and up to about 3% manganese.

12. The welded component of claim 1, wherein the nickel-based alloy includes, by weight, up to about 14% tungsten, and up to about 2% molybdenum.

13. The welded component of claim 1, wherein the gradient further includes a third welded shim composition at least partially formed by welding of a third shim having a third shim composition within the shim-shim transition composition: wherein the shim-shim transition composition also includes a first-third shim-shim transition composition between the first welded shim composition and the third welded shim composition, and a second-third shim-shim transition composition between the second welded shim composition and the third welded shim composition.

14. The welded component of claim 13, wherein the first welded shim composition and the third welded shim composition have different thicknesses.

15. The welded component of claim 1, wherein the component is a gas turbine component.

16. The welded component of claim 1, wherein the gradient further comprises a shim-shim transition region between the first welded shim composition and the second welded shim composition.

17. A welded gas turbine component, comprising:
   a first alloy;
   a second alloy; and a weld positioned between the first alloy and the second alloy;

wherein the weld is formed by a first shim and a second shim being beam welded, the first shim and the second shim forming a transition region of a gradient within the weld;

wherein the first shim includes a first composition compatible with the first alloy, the second shim includes a second composition compatible with the second alloy, and the first shim and the second shim include compatible compositions;

wherein the gradient has a gradient composition, the gradient composition increasing or decreasing in concentration, by weight; of one or both of aluminum and titanium from the first alloy, throughout both of the first composition and the second composition, to the second alloy.

18. A process of welding a component, comprising:

positioning a first alloy subcomponent;

positioning a second alloy subcomponent;

positioning a first shim and a second shim between the first alloy subcomponent and the second alloy subcomponent; and beam welding the first alloy subcomponent, the second alloy subcomponent, the first shim and the second shim to form the welded component of claim 1.

19. The process of claim 18, wherein the beam welding is electron beam welding.

\* \* \* \* \*